WILLIAM BRADLEY.
Improvement in Cotton-Presses.

No. 128,104.   Patented June 18, 1872.

UNITED STATES PATENT OFFICE.

WILLIAM BRADLEY, OF WEST POINT, GEORGIA, ASSIGNOR TO WEST POINT FOUNDRY COMPANY AND W. C. AND L. LANIER, OF SAME PLACE.

IMPROVEMENT IN COTTON-PRESSES.

Specification forming part of Letters Patent No. 128,104, dated June 18, 1872.

Specification describing an Improved Cotton-Press, invented by WILLIAM BRADLEY, of West Point, in the county of Troup and State of Georgia.

First, the invention consists in combining with a screw-press and follower an arch thrown diagonally above the top of press so as to allow the follower to be turned transversely thereacross, and thus afford free entrance on each side to the ingress of cotton. Second, it consists in combining with the press-follower a gauge-guide which gauges the distance to which the rotating follower may go, then arrests it, and finally guides it down into the press-box.

Figure 1:
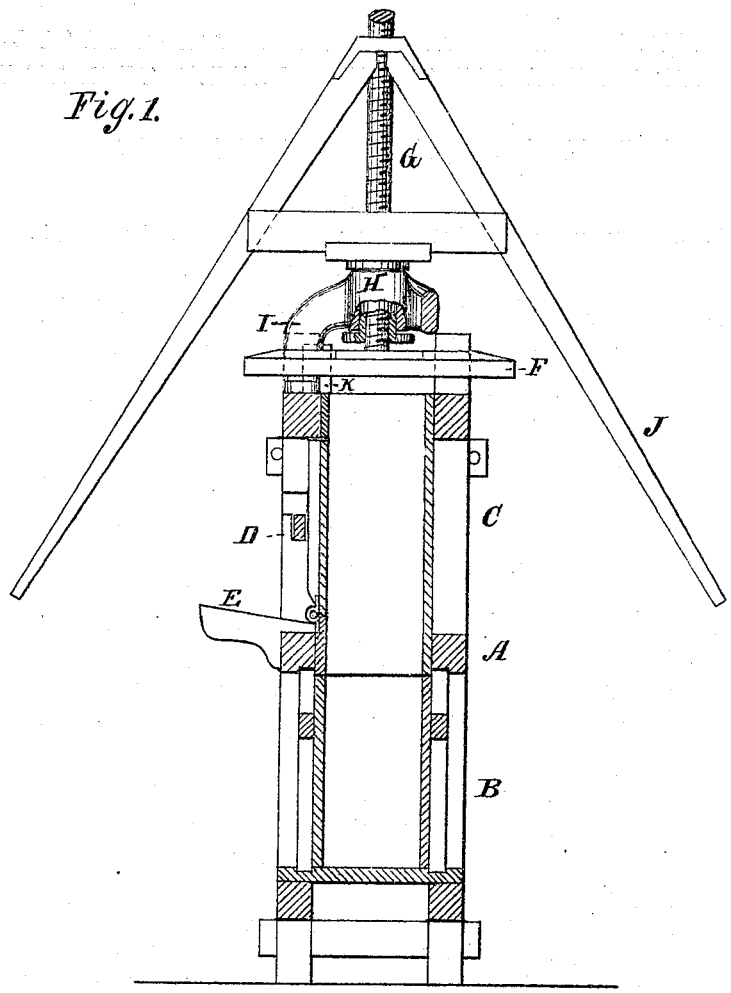
Figure 2:
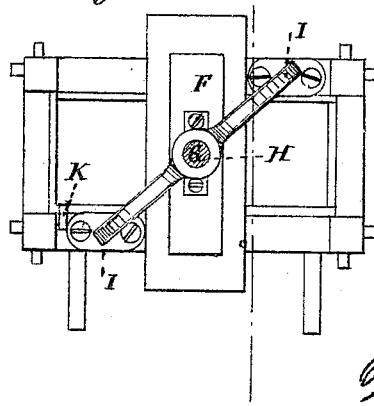

In the drawing, Figure 1 is a vertical cross-section. Fig. 2 is a top view.

A represents the frame, which supports two sections, B C, of press-box. The upper one, C, is provided with a hinged door, D, which rests on inclined supports E E. The cotton may be pushed down this inclined plane with great facility at the same time that it is being filled in from above. F is the follower, of the usual oblong rectangular form, and provided with a screw, G, working through a nut, H, which is swiveled in the arch I. This arch I is placed diagonally across the mouth of upper section C of press-box, and has such an elevation as to allow the follower to ascend above the top level of said section. As soon as the follower has, in its ascent, traveled above this level the screw ceases to turn in its nut H, but the swiveled nut turns in the arch I, carrying the follower around until it is arrested by the feet of the arch. There is then afforded a clear space on each side of the follower for the injection of cotton or whatever is to undergo pressure. The proper quantity having been introduced, the sweeps J are turned by the horses or men, when the follower again turns with (but not in) the nut until it strikes the gauge-guide K placed on one side of the box. This at once arrests it, causes the screw to turn in the nut, and guides the follower down into the section C of press-box.

Having thus described my invention, what I claim as new, and desire to secure by Letters Patent, is—

1. The follower F having screw working in a swiveled nut, in combination with the arch I thrown diagonally across the press-box, as and for the purpose described.

2. The combination, with the press-follower F, of the gauge-guide K, arranged as and for the purpose set forth.

WILLIAM BRADLEY.

Witnesses:
W. C. LANIER,
I. W. SMITH.